United States Patent [19]

Gormley

[11] Patent Number: 5,513,107

[45] Date of Patent: Apr. 30, 1996

[54] METHODS AND APPARATUS FOR CONTROLLING OPERATING SUBSYSTEMS OF A MOTOR VEHICLE

[75] Inventor: Joseph Gormley, Livonia, Mich.

[73] Assignee: Ford Motor Company, Dearborn, Mich.

[21] Appl. No.: 992,371

[22] Filed: Dec. 17, 1992

[51] Int. Cl.[6] .................................................. G06F 17/00
[52] U.S. Cl. .................. 364/424.05; 180/287; 307/10.2; 340/825.31
[58] Field of Search ........................ 364/424.01, 424.03, 364/424.04, 424.05, 431.04, 550, 551.01; 307/10.1, 10.2, 10.3, 10.4, 10.5; 340/825.31, 825.32, 825.33, 825.34; 180/287

[56] References Cited

U.S. PATENT DOCUMENTS

| | | | |
|---|---|---|---|
| 3,665,397 | 5/1972 | Di Napoli et al. | 340/825.33 |
| 4,072,850 | 2/1978 | McGlynn | 364/424.04 |
| 4,344,136 | 8/1982 | Panik | 364/424.04 |
| 4,366,466 | 12/1982 | Lutz | 340/825.31 X |
| 4,593,357 | 6/1986 | Van Ostrand et al. | 364/424.04 |
| 4,749,210 | 6/1988 | Sugasawa | 280/707 |
| 4,754,255 | 6/1988 | Sanders et al. | 340/825.31 X |
| 4,760,275 | 7/1988 | Sato et al. | 307/10.1 |
| 4,787,040 | 11/1988 | Ames et al. | 364/424.01 |
| 4,809,175 | 2/1989 | Hosaka et al. | 364/424.01 |
| 4,809,199 | 2/1989 | Burgess et al. | 364/550 |
| 4,811,240 | 3/1989 | Ballou et al. | 364/424.01 |
| 4,843,557 | 6/1989 | Ina et al. | 364/431.07 |
| 4,864,568 | 9/1989 | Sato et al. | 371/8.2 |
| 4,882,693 | 11/1989 | Yopp | 364/424.01 |
| 4,930,084 | 5/1990 | Hosaka et al. | 364/426.04 |
| 4,965,460 | 10/1990 | Tanaka et al. | 307/10.2 |
| 5,058,044 | 10/1991 | Stewart et al. | 364/551.01 |
| 5,072,397 | 12/1991 | Abe | 364/424.04 |
| 5,091,856 | 2/1992 | Hasegawa et al. | 364/424.05 |
| 5,278,547 | 1/1994 | Suman et al. | 340/825.32 |
| 5,289,369 | 2/1994 | Hirshberg | 340/825.31 X |
| 5,369,584 | 11/1994 | Kajiwara | 364/424.05 |

FOREIGN PATENT DOCUMENTS

| | | |
|---|---|---|
| 0235656 | 2/1987 | European Pat. Off. . |
| 2222704 | 3/1990 | United Kingdom . |
| WO8403785 | 9/1984 | WIPO . |

OTHER PUBLICATIONS

GM SAE Paper 901170, *Required Elements of Integrated Vehicle Control System*, pp. 463–471. 1990.

Nissan SAE Convergence '89 Paper *The Next Step In Automative Electronic Control*, pp. 83–89 1989.

*Primary Examiner*—Collin W. Park
*Attorney, Agent, or Firm*—Roger L. May; Peter Abolins

[57] ABSTRACT

Parameters for operation of a number of vehicle operating subsystems are stored in a vehicle controller and selected to control and configure the operating subsystems. Control and configuration can be based on individual recognized operators of the vehicle or an operating mode can be selected for the vehicle. For example, sport, cruise, luxury, off-road or other performance modes can be set up and selected. If a vehicle is to be operated by an authorized person who is not a recognized operator or is not authorized to select a mode of operation, default operating characteristic parameters are stored and selected. If the authorized person is to be restricted in the possible operation of the vehicle, a further set of limited operating characteristic parameters are stored and selected, preferably by entry of control signals corresponding to a security code. For example, if a valet is parking the vehicle, the limited operating parameters are selected. For security purposes, the limited operating parameters can be invoked after a defined period of time. Diagnostic and maintenance of the vehicle is provided by monitoring at least the operating subsystems connected to the vehicle controller and recording diagnostic data. The controller communicates accumulated data to a service center on a periodic or as needed basis for analysis by the service center. The service center in turn communicates with the controller regarding service needed by the vehicle. The controller then advises operators of the vehicle of the information received from the service center.

2 Claims, 2 Drawing Sheets

METHODS AND APPARATUS FOR CONTROLLING OPERATING SUBSYSTEMS OF A MOTOR VEHICLE

BACKGROUND OF THE INVENTION

The present invention relates in general to the control of operating subsystems of a motor vehicle and, more particularly, to methods and apparatus for integrating the control of a plurality of motor vehicle operating subsystems. Preferably, the control is customized to the desires and requirements of recognized operators of a vehicle to enhance performance of the vehicle as perceived by the recognized vehicle operators. Vehicle reliability is also improved by monitoring vehicle operating subsystems for maintenance and diagnostic purposes.

In recent years, improvements in electrical and electronic components have increased their reliability and acceptance in the hostile motor vehicle environment. The electronic component is often a microprocessor which introduces the versatility of program control into operating subsystems of a motor vehicle.

One operating subsystem which has been substantially taken over by electronic or computer control is the engine operating or control subsystem. Computer control of internal combustion engines has been effectively mandated by the precision required to meet fuel efficiency and environmental protection requirements and the continuing demand for superior vehicle performance.

Other examples of motor vehicle operating subsystems which have been enhanced by the improved control possible by using electronic and electrical control include anti-lock brakes, active and/or adjustable suspension subsystems, power assisted steering, traction control subsystems, entertainment subsystems, and comfort/convenience subsystems.

While operation of the noted as well as other vehicle operating subsystems have been improved by the conversion to electrical and electronic control, each known operating subsystem has been developed as a substantially autonomous, stand-alone entity. Operating characteristics of such autonomous subsystems often can be adjusted during production of a motor vehicle and, to a much more limited extent, after production by a vehicle dealer or customer. Unfortunately, by-in-large the operating characteristics of such autonomous subsystems are fixed at production and can only be changed by replacement or retrofitting a new autonomous subsystem.

Examples of vehicle operating subsystems which can be adjusted after production include: some suspension subsystems which can be adjusted, for example among hard, normal and soft settings by the vehicle operator; engine control subsystems which can be adjusted between economy and power settings; traction control subsystems which can be adjusted between four-wheel drive and two-wheel drive; and, comfort/convenience subsystems which can be set to preposition a seat, steering wheel and the like for one or more operators.

To further expand the comfort and convenience of operators of motor vehicles including electrically or electronically controlled operating subsystems such as those noted above, there is a need for an integrated control system which will control and configure such vehicle operating subsystems in response to control signals. For example, such control signals can identify one or more recognized operators who have previously identified their preferences for operating characteristics of the motor vehicle. Preferably, such an integrated control system would provide additional adjustability of the vehicle operating subsystems after production by a vehicle dealer and/or operator. Further, it would be desirable for such an integrated control system to perform diagnostic and security functions for the vehicle.

SUMMARY OF THE INVENTION

This need is met by the methods and apparatus of the present invention wherein operating characteristics of a motor vehicle are selected in response to control signals or, in some instances, failure to receive control signals. Operating characteristic parameters are stored in an integrated control system controller from which they are retrieved to control and configure operating subsystems of the motor vehicle and thereby the motor vehicle itself. Control and configuration can be based on individual recognized operators of the vehicle or, alternately, an operating mode can be selected for the vehicle. For example, the vehicle can be selected to provide sport performance, cruise performance, luxury performance, off-road performance or a like mode of performance.

The operating characteristic parameters control and configure a number of operating subsystems of the vehicle including, for example, the suspension, the engine, the power train and the steering. The operating characteristics of these subsystems are thus defined to correspond to recognized operator desires and/or an operating mode dependent upon control signals entered by an operator of the vehicle.

If a vehicle is to be operated by an authorized person who is not a recognized operator or is not authorized to select the mode of operation of the vehicle, default operating characteristic parameters are also stored and selected in this event. If the authorized person is to be restricted in the operation of the vehicle, a further set of limited operating characteristic parameters are stored and selected for operation of the vehicle in a restricted mode. Preferably, selection of the restricted mode of vehicle operation is performed by entry of control signals corresponding to a security code. For example, a specific restricted mode of operation, valet mode, is selected if a valet is to be operating the vehicle.

For security purposes, a restricted mode of operation which disables the vehicle after a defined period of time can be invoked. Accordingly, if the vehicle is stolen or carjacked, the thief or carjacker can operate the vehicle in an existing mode for the given period of time, but is then restricted by vehicle disabling after expiration of the given time period. To reduce the possibility of the vehicle becoming a hazard after being disabled, such disabling can be conditioned upon status of the vehicle when it is to be disabled. For example, it is desirable to only disable the vehicle when it is stopped.

Diagnostics and maintenance of operating subsystems of the vehicle are also provided by monitoring at least the operating subsystems connected to the controller and recording diagnostic data. In addition, the controller can communicate accumulated data to a service center on a periodic or as needed basis for analysis by the service center. The service center in turn communicates with the controller regarding service needed by the vehicle. The controller advises operators of the vehicle at an appropriate time of the information received from the service center.

In accordance with one aspect of the present invention, an integrated control system for a motor vehicle comprises vehicle controller means for controlling and configuring operating characteristics of the motor vehicle in response to control signals. The vehicle controller means comprises memory means for storing vehicle control characteristics selectable by the control signals. Suspension control means of the vehicle is connected to and configured by the vehicle controller means for controlling a suspension subsystem of the motor vehicle in response to the vehicle control characteristics. In like manner, engine control means is connected to and configured by the vehicle controller means for controlling an internal combustion engine of the motor vehicle in response to the vehicle control characteristics. Power train control means of the vehicle is connected to and configured by the vehicle controller means for controlling a power train connected between the internal combustion engine and drive wheels of the motor vehicle in response to the vehicle control characteristics. Steering control means is connected to and configured by the vehicle controller means for controlling a steering subsystem of the motor vehicle in response to the vehicle control characteristics. Input means provide for generating the control signals. Preferably the control signals comprise operator identification signals for identifying at least one recognized operator of the motor vehicle.

In accordance with another aspect of the present invention, a method of controlling a plurality of operating subsystems within a motor vehicle comprises the steps of: connecting a master vehicle controller to the operating subsystems; storing operating characteristics for configuring and controlling the plurality of operating subsystems in a memory of the master vehicle controller; selecting a set of operating characteristics from the stored operating characteristics; and, transmitting the selected set of operating characteristics to the plurality of operating subsystems for operation of the motor vehicle. Preferably, the step of storing operating characteristics for configuring and controlling the plurality of operating subsystems comprises the steps of: storing for at least one of the operating subsystems at least two ranges of operating characteristics; and, storing subrange values of operating characteristics for each of the at least two ranges of operating characteristics.

In accordance with yet another aspect of the present invention, a method of controlling a plurality of operating subsystems within a motor vehicle from a master vehicle controller comprises the steps of: storing vehicle control characteristics for at least one recognized operator of the vehicle in a memory of the master vehicle controller; receiving operator identification input signals; comparing received operator identification input signals to operator signals identifying the at least one recognized operator; and, transmitting the vehicle control characteristics for the at least one recognized operator to the plurality of operating subsystems for operation of the motor vehicle only upon a match of the identification input signals and the operator signals.

It is thus a feature of the present invention to provide improved methods and apparatus for selecting operating characteristics of a motor vehicle; to provide improved methods and apparatus for selecting operating characteristics of a motor vehicle in correspondence with recognized operators of the vehicle; and, to provide improved methods and apparatus for selecting operating characteristics of a motor vehicle including limited operating characteristic parameters which restrict or even disable operation of the motor vehicle.

Other features and advantages of the invention will be apparent from the following description, the accompanying drawings and the appended claims.

DETAILED DESCRIPTION OF THE INVENTION

Figure 1:
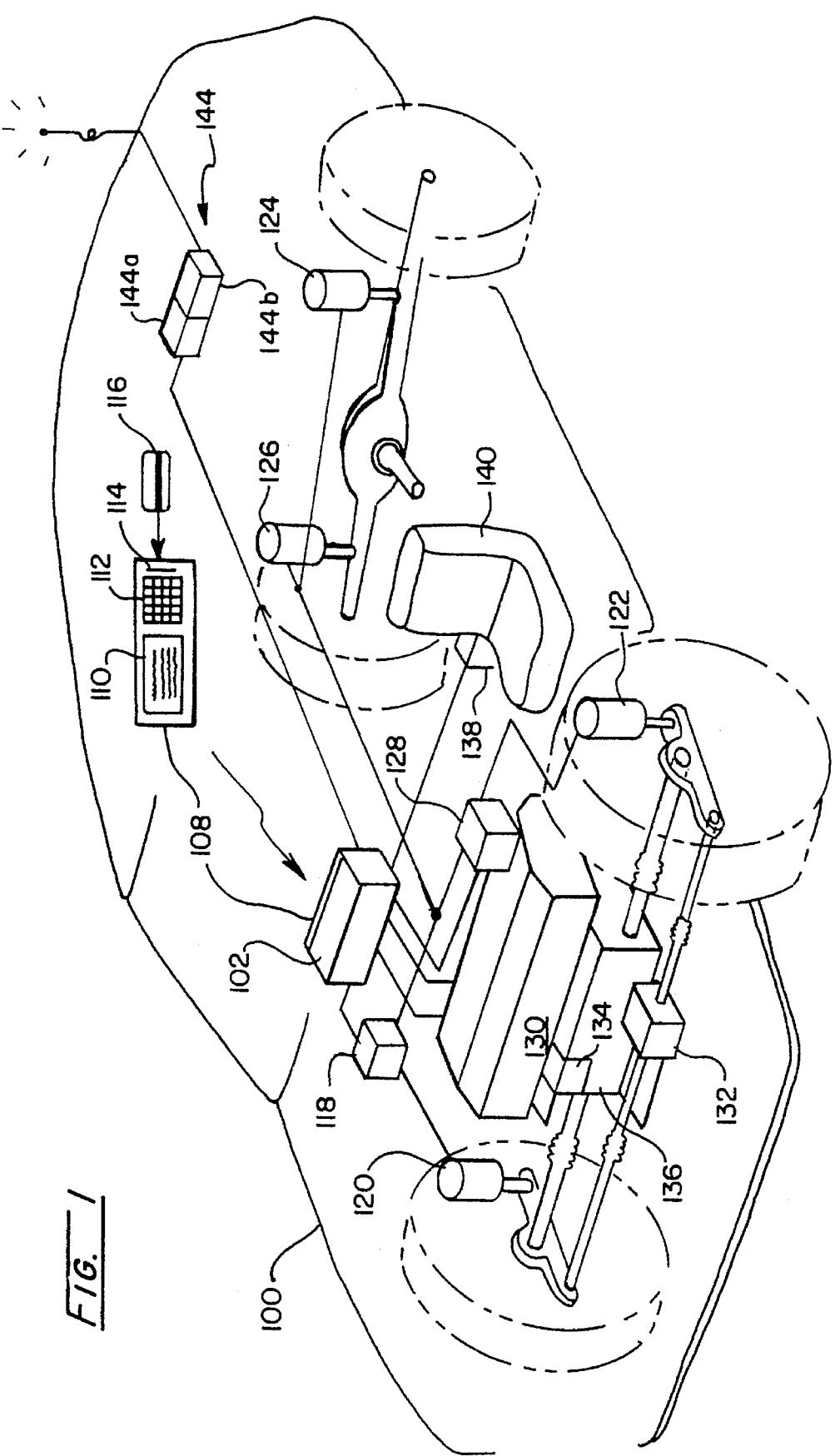
FIG. 1 is a schematic perspective view of a motor vehicle including an integrated control system.
Figure 2:
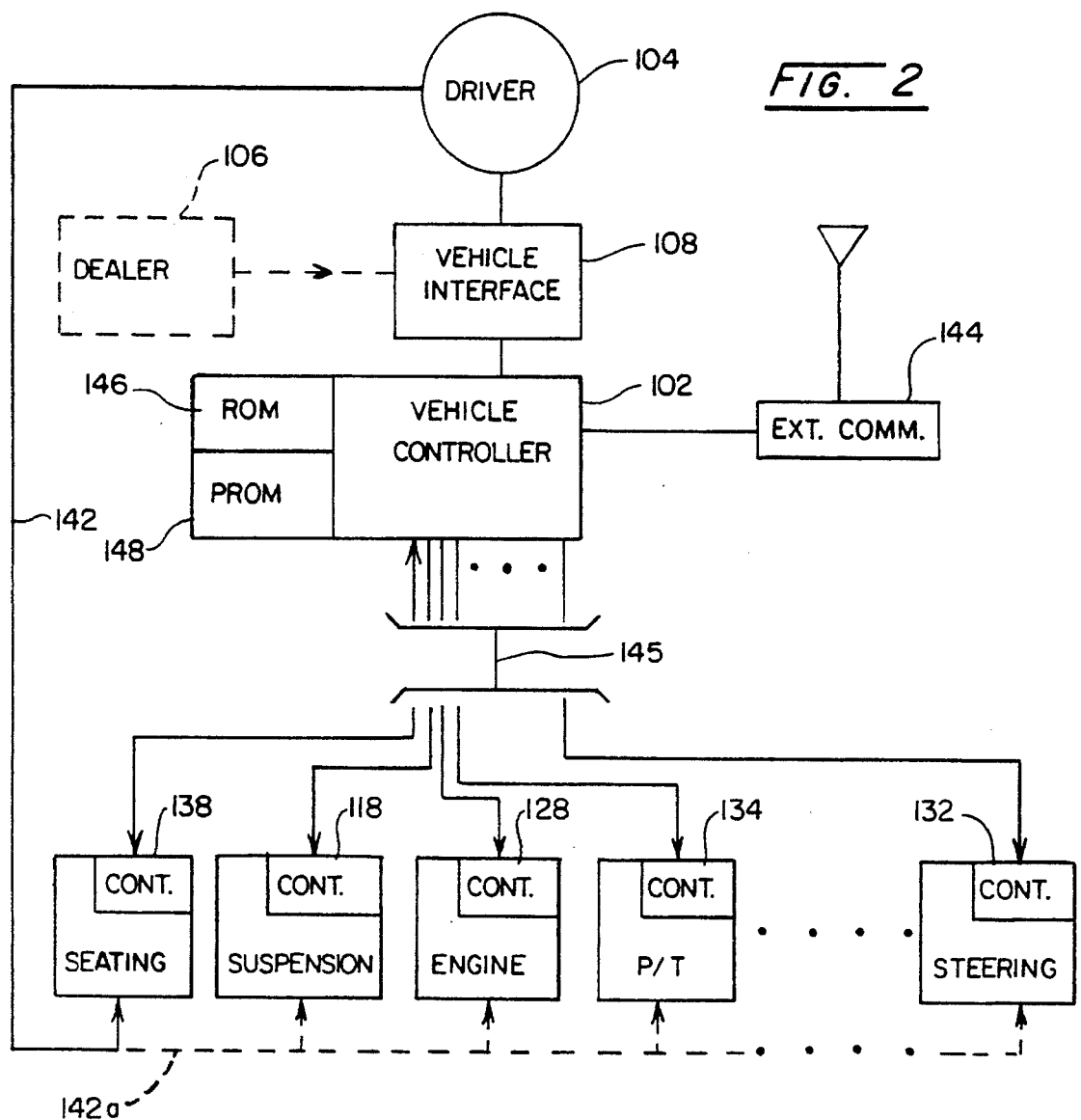
FIG. 2 is a block diagram of the integrated control system of FIG. 1.

In FIG. 1, a schematically illustrated motor vehicle 100 is equipped with an integrated control system operable in accordance with the present invention. The integrated control system comprises a processor based vehicle controller 102 for controlling and configuring operating characteristics of the motor vehicle 100. As shown in FIG. 2, a driver 104 of the motor vehicle 100 and possibly others, such as for example a dealer 106, communicate with the vehicle controller 102 by means of a vehicle interface 108. As suggested in FIG. 2, the dealer 106 may communicate with the vehicle controller 102 by means of a separate connection through the vehicle interface 108 or otherwise. A separate connection for dealership personnel may be preferred to prevent inadvertent accessing of any dealer only operations within the vehicle controller 102.

As shown in FIG. 1, the vehicle interface 108 includes a display 110 through which the integrated control system communicates with a user, typically the driver 104, of the motor vehicle 100. A keypad 112 is provided on the vehicle interface 108 for the user to communicate with the integrated control system. In the preferred embodiment of the integrated control system of the present application, a card reader 114 is also provided for rapid and accurate communication with the interface 108.

The card reader 114 receives magnetically or otherwise encoded vehicle operator identification, program and memory cards 116 and generates operator identification signals, data and instructions in response to the currently inserted card 116. The vehicle controller 102 is responsive to the generated signals for controlling and configuring the operating characteristics of the vehicle 100. For example, the operating characteristics of the vehicle 100 can be set up in accordance with the desires and requirements of an identified operator in response to generated operator identification signals.

The vehicle controller 102 is connected to a number of processor controlled operating subsystems of the vehicle 100. For example, the vehicle controller 102 is connected to suspension control means comprising a suspension controller 118 which in turn is connected to suspension control units 120–126 for controlling the suspension characteristics for the vehicle 100.

A variety of suspension control arrangements are know in the art ranging from actively controlled suspension subsystems to adjustable suspension subsystems which permit the driver 104 to select among a variety of possible suspension definitions, such as for example soft, normal or hard. Since these suspension control subsystems are well known in the art, they will not be further described herein. Suffice it to say that the suspension controller 118 can be configured to control the suspension in a variety of ways dependent upon its configuration.

The vehicle controller 102 is also connected to engine control means comprising an engine controller 128 which controls operation of an internal combustion engine 130 of the vehicle 100. Engine controllers are well known in the art and can be configured, for example, to control an engine in an economical mode or a power mode. Variations between these two extremes are possible with standard engine operation commonly being selected near an intermediate point between these two extremes.

Modern vehicle power steering is commonly made to be variable assist in that the power assistance provided is dependent upon a defined gain characteristic curve. The gain characteristic curve is tailored to provide the handling characteristics desired for a given motor vehicle. The selected power steering assist gain characteristic curve is then loaded into steering control means comprising a power steering controller 132 of the vehicle 100. The vehicle controller 102 is connected to the power steering controller 132 for operation of the integrated control system of the present application.

The vehicle controller 102 is also connected to power train (P/T) control means comprising a P/T controller 134 of the vehicle 100. The P/T controller 134 defines the shift points for the transmission 136 with which it is associated and can provide other features such as for example traction control and shifts between two-wheel and four-wheel drive in appropriately equipped vehicles.

The vehicle controller 102 of FIG. 1 is also connected to a seat controller 138 for adjusting the position of an operator's seat 140 of the vehicle 100. The seat controller 138 is representative of an operating subsystem which permits direct operator control as indicated by the driver 104 control connection 142 as shown in FIG. 2. While the preceding operating subsystems of the vehicle 100 can also be operated directly by the driver 104 as shown by the dotted line control connections 142a, these subsystems are typically controlled in accordance with predefined operating characteristics within the subsystems or as defined by the vehicle controller 102 as will be described.

Directly controllable subsystems may be used to set the corresponding subsystem and thereby define data for programming the vehicle controller 102. In this way, for example, preferred seat settings for recognized operators of the vehicle 100 are programmed into and available from the vehicle controller 102.

Finally, in the vehicle 100 of FIG. 1, the vehicle controller 102 is connected to an external communications subsystem 144. As shown, the external communications subsystem 144 comprises a modem 144a and a mobile telephone 144b; however, other communications subsystems can be used in the present invention. It should be apparent that other operating subsystems provided for a given vehicle can be connected to the vehicle controller 102. Such expansion is suggested by the space provided between the power steering controller 132 and the P/T controller 134 of FIG. 2.

The vehicle controller 102 can be directly connected to operating subsystems of a vehicle; however, it is preferred to perform the interconnections by means of a multiplex link 145. Multiplex links for use in motor vehicles are well known and standardized in the art. Accordingly, the multiplex link 145 will not be described in detail herein.

In accordance with the invention of the present application, previously independent and predefined operating subsystems of a motor vehicle are connected to the vehicle controller 102 as described and controlled/configured by the vehicle controller 102. By storing characteristics for operation of the previously independent operating subsystems in the vehicle controller 102 for recognized operators of the vehicle 100, the vehicle 100 is effectively customized and optimized in accordance with the wants and needs of the individual operators.

For example, an operator, operator #1, desiring high performance stores operating characteristics to optimize the performance of the vehicle 100 in the vehicle controller 102. Thus, the suspension is set to its hard, best handling position, the engine is set to provide high power rather than economy, the power train is set to provide shift points corresponding to high performance and the steering is set to provide rapid response for best control and handling of the vehicle 100. While not directly related to performance, the seat 140 is also set to a preferred position for operator #1.

Any additional operating subsystems of the vehicle 100 are also set in a manner to provide the highest performance possible from the vehicle 100. In addition, other comfort/convenience subsystems are also set. For example, operator #1's favorite radio station and volume setting can be preset by the vehicle controller 102. All these settings, once programmed into the vehicle controller 102, are selected in response to identification of operator #1.

As previously described, it is preferred to have a rapid operator identification system, such as the card reader 114, incorporated into the integrated control system of the present application. Of course other rapid operator identification systems can be used. For example, voice recognition, key entry via a physical key or a key entered on the keyboard 112, fingerprint recognition or the like can be used. In any event, once the operator is identified as operator #1, the operating subsystems of the vehicle 100 are configured to operate in accordance with that operators desires and preferences.

Another operator, operator #2, may be more sedate and interested in the best quality of ride and perhaps better mileage performance from the vehicle 100. Thus, the suspension is set to its soft, best ride position, the engine is set to provide economy rather than high performance, the power train is set to provide shift points corresponding to economy performance and the steering is set to provide a more leisurely, more power assisted response for the vehicle 100. While not directly related to performance, the seat 140 is also set to a preferred position for operator #2.

Any additional operating subsystems of the vehicle are also set in a manner to provide the best "cruise" performance possible from the vehicle 100. In addition, other comfort/convenience subsystems are also set. For example, operator #2's favorite radio station and volume setting can be preset by the vehicle controller 102. All these settings, once programmed into the vehicle controller 102, are selected in response to identification of operator #2.

As an alternative, a number of different modes of operation of the vehicle 100 can be defined to permit the operator of the vehicle 100 to select the mode of operation that is desired for a given operation period. Thus, operator #1 would conveniently have the option of operating the vehicle 100 in the cruise mode and operator #2 would have the option of operating the vehicle 100 in the high performance mode.

In addition to being able to provide customized operation for recognized drivers of the vehicle 100, it is desirable to provide default operating characteristics for an authorized operator of the vehicle 100. Thus, if an operator is authorized to drive the vehicle 100, for example the operator has an ignition key for the vehicle 100, but is unable to enter a recognized operator code into the integrated control system, the vehicle 100 is operable with conventional, default operating characteristics which are defined for the vehicle 100 and permanently stored in the vehicle controller 102.

To this end, the vehicle controller 102 includes read only memory (ROM) 146. Since operating characteristics corresponding to individual operators must be able to be modified, the operating characteristics such as those described above relative to operator #1 and operator #2 are stored in programmable read only memory (PROM) 148.

In addition to the default operating characteristics for authorized drivers who are not recognized operators of the vehicle 100, restricted vehicle operating characteristics are stored in the ROM 146 of the vehicle controller 102. Restricted operating characteristics define substantially reduced capabilities for the vehicle 100 and are called up by operation of security means, such as entry of a security code into the vehicle controller 102. One set of restricted vehicle operating characteristics are invoked, for example, when one is leaving the vehicle 100 with a valet at a parking lot. This set of restricted operating characteristics or valet operating characteristics, permit safe operation of the vehicle 100 within a parking lot but otherwise substantially restrict performance of the vehicle 100.

Restricted operating characteristics can also prove valuable in the event the vehicle 100 is stolen or carjacked. In the event the vehicle is carjacked, the operator enters a security code which invokes restricted operating characteristics, for example, after a defined period of time. Thus, the carjacker would steal the vehicle operating under currently defined operating characteristics but after the defined period of time elapses, the operation of the vehicle 100 is greatly reduced or entirely disabled in accordance with the restricted operating characteristics.

To reduce the possibility that the vehicle presents a hazard once switched to a restricted operating mode, operation of the vehicle 100 can be restricted or disabled depending not only on time but also depending on vehicle operations such that for example the transition to restricted operating characteristics takes place only after the vehicle is stopped. Further, if vehicle security subsystems are unable to prevent a thief from accessing the vehicle 100, restricted operating characteristics are selected to greatly limit or disable operation of the vehicle 100.

In the integrated control system of the present application as described above, the operator of the vehicle 100 is able to customize the operating characteristics of the vehicle 100 by selecting one of a plurality of operating ranges for a number of different operating subsystems of the vehicle 100. By selecting desired ones of the available ranges of operating characteristics and storing those selections, a number of operators of the vehicle can customize the vehicle 100 each time they operate the vehicle 100 simply by entering their identifications. Alternately, a number of different vehicle set-ups can be easily selected. The options and complexity of the setup procedure can be adjusted by the dealer at vehicle delivery.

Figure 3:
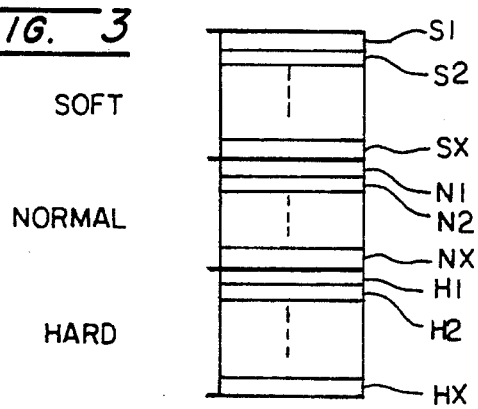
FIG. 3 is a diagram of a data storage block for use in the integrated control system of FIG. 1.

In addition, the integrated control system of the present application permits fine tuning of each of the vehicle operating subsystems by defining subrange operating values within some or all of the operating ranges which are selected by recognized operators of the vehicle 100. For example, as shown in FIG. 3 for the suspension subsystem of the vehicle 100, the operator can select among three suspension ranges: soft, normal and hard.

In addition, it is possible to select subrange values within each of the suspension ranges. Thus, selection of the soft suspension range will retrieve any one of the subrange values S1 to SX; selection of the normal suspension range will retrieve any one of the subrange values N1 to NX; and, selection of the hard suspension range will retrieve any one of the subrange values H1 to HX.

While it would be possible to permit the driver 104 to select within the subrange values, it is currently believed that such fine tuning is best performed by the dealer at set up. Thus, if a customer believes that the ranges which can be selected are not in accordance with his or her ideal understandings of what those ranges should be, the dealer can fine tune the settings by selecting among the subrange values.

In addition to being able to customize the vehicle 100 to a number of operators and/or operating modes and perform restricted operation security functions as described above, the integrated control system of the present application is also able to assist in maintenance and diagnosis of operating problems within the vehicle 100. In particular, the vehicle controller 102 is able to monitor various operating characteristics of the operating subsystems to which it is connected. Further, subsystems other than those described above can be connected to the vehicle controller 102 for maintenance and diagnostic purposes. The vehicle controller 102 thus also monitors and records parameters relating to the operations of subsystems within the vehicle 100.

While the vehicle controller 102 is able to record diagnostic and maintenance related parameters within its PROM 148 or other memory for later read out by maintenance personnel, it is preferred to periodically communicate maintenance and diagnostic data to a service center for the vehicle 100. To this end, the vehicle controller 102 is connected to the external communications subsystem 144, such as a mobile telephone, which contacts the service center as required. The mobile telephone is instructed to dial an 800 number at the service center. Upon connection to the service center, the vehicle controller down loads accumulated diagnostic data for analysis at the service center.

In the event the diagnostic data indicate that a fault is present or suggest that a fault is imminent, the service center communicates an appropriate notice to the vehicle controller 102 of the vehicle 100. The vehicle controller 102 advises the operator of the vehicle 100 of the problem via the display 100 at the appropriate time. However, for non-urgent concerns, the operator of the vehicle may be contacted by the dealer with a detailed description at a time convenient to the vehicle operator. The operator of the vehicle 100 is thus advised to take the vehicle 100 to be serviced if necessary with the urgency of the service required being reflected in the service notice.

Having thus described the invention of the present application in detail and by reference to preferred embodiments thereof, it will be apparent that modifications and variations are possible without departing from the scope of the invention defined in the appended claims.

What is claimed is:

1. An integrated control system for a motor vehicle comprising:

vehicle controller means for controlling and configuring operating characteristics of said motor vehicle in response to control signals, said vehicle controller means comprising memory means for storing vehicle control characteristic parameters selected by said control signals;

suspension control means connected to and configured by said vehicle controller means for controlling a suspension subsystem of said motor vehicle in response to said vehicle control characteristic parameters;

engine control means connected to and configured by said vehicle controller means for controlling an internal combustion engine of said motor vehicle in response to said vehicle control characteristic parameters;

power train control means connected to and configured by said vehicle controller means for controlling a power train connected between said internal combustion engine and driven wheels of said motor vehicle in response to said vehicle control characteristic parameters;

steering control means connected to and configured by said vehicle controller means for controlling a steering subsystem of said motor vehicle in response to said vehicle control characteristic parameters; and input means for generating said control signals, at least some of said vehicle control characteristic parameters being stored and selected as a plurality of ranges with each of said ranges having a plurality of subrange values which are stored and selected within said ranges, currently selected subrange values within a range defining the value of the range, said input means further providing for generation of selection signals for selecting said ranges and said subrange values within said ranges.

2. A method of controlling operation of a plurality of operating subsystems within a motor vehicle, said plurality of operating subsystems defining operations characteristics of said motor vehicle and said method comprising the steps of:

connecting a master vehicle controller to said operating subsystems;

storing operating characteristic parameters for configuring and controlling said plurality of operating subsystems in a memory of said master vehicle controller by performing the steps of:

storing for at least one of said operating subsystems at least two ranges of operating characteristic parameters; and storing subrange values of operating characteristic parameters for each of said at least two ranges of operating characteristic parameters;

selecting a set of operating characteristic parameters from said stored operating characteristic parameters by selecting one of said subrange values of operating characteristic parameters for each range of operating characteristic parameters such that said selected one of said subrange values of operating characteristic parameters will be provided upon selection of the corresponding range of operating characteristic parameters; and transmitting said selected set of operating characteristic parameters to said plurality of operating subsystems for operation of said motor vehicle.

* * * * *